though preferably they will be integral.

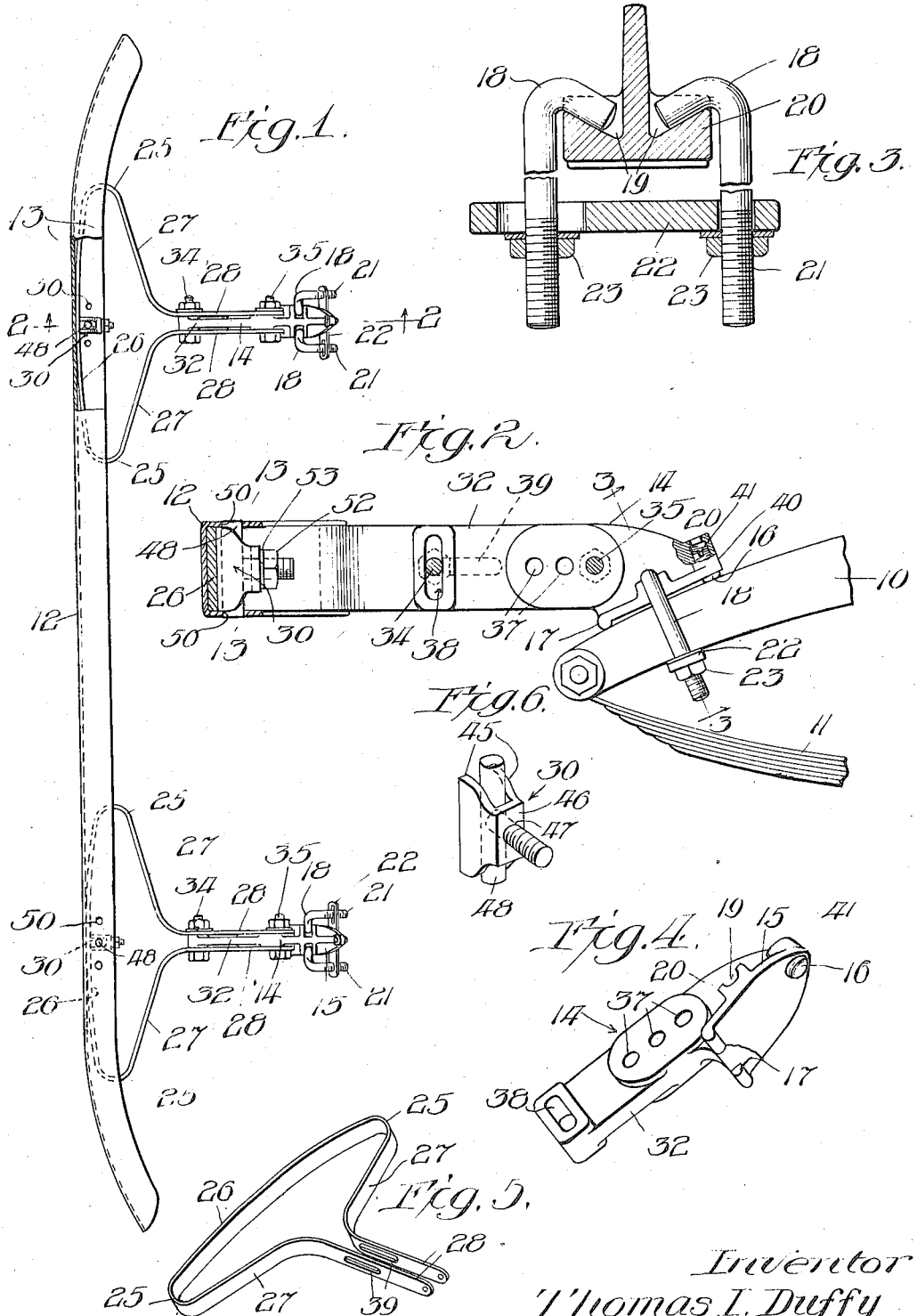

UNITED STATES PATENT OFFICE.

THOMAS I. DUFFY, OF CHICAGO, ILLINOIS.

BUMPER FOR AUTOMOBILES.

1,265,066.

Specification of Letters Patent.

Patented May 7, 1918.

Application filed January 15, 1917. Serial No. 142,401.

*To all whom it may concern:*

Be it known that I, THOMAS I. DUFFY, a citizen of the United States, residing at Chicago, in the county of Cook and State of Illinois, have invented certain Improvements in Bumpers for Automobiles; and I do hereby declare that the following is a full, clear, and exact description thereof, reference being had to the accompanying drawings, and to the characters of reference marked thereon, which form a part of this specification.

This invention relates to improvements in bumpers for automobiles and similar vehicles and refers more specifically to a novel impact spring for such bumper to transmit the impact of shocks from external objects to the frame, and relates also to novel means for attaching the bumper to the vehicle frame, whereby it may be universally adjusted to fit frames of varying types and dimensions of parts.

Among the objects of the invention is to provide an attractive and sturdy spring mounting for the bumper bar so arranged as to efficiently transmit the impact of shocks from the bumper bar to the vehicle frame in whatever direction received by the bumper bar; to provide a novel bracket for connecting the bumper to the vehicle frame so constructed as to provide means for adjusting the angle of the bumper bar to the horizontal; to provide a novel connection between the bumper and the vehicle frame so arranged as to permit the bumper bar to be adjusted toward and from the vehicle frame, and thereby balance the bumper to frames of various designs; to provide novel means for attaching the bumper to the vehicle frame, constructed to accurately adjust the attaching means to the width of the frame member to which the bumper is attached, and generally to improve and simplify bumpers for the purpose described.

The invention consists in the combinations and arrangements of the parts shown in the drawings and described in the specifications, and is pointed out in the appended claims.

I have herein shown one embodiment of my invention which is more particularly adaptable to automobiles using either full or semi-elliptical front springs, in the former arrangement of which the bumper is attached to the upper half of the full elliptical spring, and in the latter arrangement of which the bumper is attached to extensions of the side frames of the vehicle associated with the lower semi-elliptical springs. It will be understood, however, that the general features of the invention herein disclosed may be employed with vehicles having front springs of other types, in which event other attaching means will be employed to attach the same to the vehicle frame so as to transmit the thrust against the frame, preferably in line with the side members thereof.

In the drawings:—

Figure 1 is a plan view of a bumper embodying my invention, with parts in section.

Fig. 2 is a section on the line 2—2 of Fig. 1 showing the bracket attached to a vehicle frame member.

Fig. 3 is a detail section on the line 3—3 of Fig. 2.

Fig. 4 is a perspective view of one of the attaching brackets.

Fig. 5 is a perspective view of one of the thrust resisting springs.

Fig. 6 is a perspective view of one of the fittings by which the bumper bar is attached to the thrust resisting springs.

As shown in the drawings 10 designates the frame member of the vehicle to which the bumper is attached, said frame member consisting in the present instance of the extended end of the side bar of the vehicle frame and which coöperates with lower semi-elliptical spring 11 of the vehicle in a well known manner. The said member may, however, be any frame member of the vehicle.

12 designates the bumper bar which is herein shown as made of channel cross section with the flanges 13 directed rearwardly. 14, 14 designate brackets by which the bumper is attached to the frame members, said brackets being provided at their rear ends with saddles 15, which are hollowed at their lower surfaces to fit the upper curved faces of the frame members 10. In order to adapt the saddles to seat upon frame members of different contours said saddles are preferably tapered at their rear ends and are provided at the lower faces of their rear ends with bearing points or projections 16 and are provided at their front ends with transverse ribs or enlargements 17, giving, in effect, a three point bearing of the saddles on the frame members. The ribs or enlargements may be spaced from or integral with each other, as desired.

Each bracket is attached to the frame member by means of L-shaped bolts 18, the shorter legs of which engage inwardly and downwardly tapered pockets 19 formed in bosses 20 on the upper face of the saddle. The longer legs 21 of said bolts extend down alongside the frame member and through apertures in a tie bar 22 and are threaded at their lower ends to receive nuts 23.

By reason of the tapered pockets 19 which are engaged by the shorter legs of the angular bolts 18, the said bolts are caused to hug the sides of the frame member 10 when the nuts 23 are tightened, whereby said bolts are adapted to be accurately and reliably fitted to frame members of different widths. In order to provide for this adjustment each of the tie bars may be provided at one end with an elongated opening or slot through which one of the bolts extend.

25, 25 designate springs which transmit the impact of the thrust from the bumper bar to the brackets. Each of said springs, as herein shown, is made of a single piece of flat spring metal which is bent between its ends to form a closed or substantially closed elliptical spring, comprising a front curved portion (preferably having a short flat central portion), two converging or inwardly turned portions 27 which are opposed to said central portion and terminal portions 28, which latter are directed rearwardly and lie parallel to and are spaced from each other. The central portion of each spring lies between the flanges 13 of the bumper bar and is attached to said bar by an adjusting fitting 30 hereinafter described, so constructed as to securely fix the spring to the bumper bar, while permitting the bar to be adjusted relatively to the springs and thereby adjust the bumper, as a whole, to vehicles of varying widths.

By reason of the curvature of the central portion of the spring, the ends of said central portion are curved away from the web of the bumper bar. Therefore, stress placed on said springs, in transmitting the impact of a thrust against the bumper bar, tends to straighten said central portions of the springs and to thereby utilize the resiliency thereof to yieldingly transmit the thrust to the vehicle frame. The said thrust is also transmitted to the vehicle frame through the converging members 27 of said spring which adds to the cushioning of the transmitted stress to relieve the vehicle frame of objectionable shocks. By reason of the symmetrical arrangement of the converging members 27 of the springs relatively to the central members 28 thereof, the springs are exceedingly sturdy to transmit the impact of thrusts to the vehicle frame without tendency to lateral strain or distortion of the springs or their attachment to the vehicle frame, and is further calculated to withstand blows or shocks which are brought to bear against the bumper bar at oblique angles to the face of the bumper bar.

The brackets are provided with forwardly extending flat shanks 32 that lie between the terminal members 28 of the springs and are attached thereto by means of bolts 34, 35, which extend through openings in the overlapping spring terminals and the shanks. In order to vertically adjust the bumper bar with respect to the vehicle frame, I may provide an adjustment between the brackets and the spring terminals which is made as follows:

The rear bolts 35 of the brackets fit closely in openings in the spring terminals through which they extend and in registering openings 37 of the bracket shanks. The other or forward bolts 34, as herein shown, extend through elongated or slotted openings 39 in the spring terminals for a purpose hereinafter described, but the openings 38 in the brackets are transversely elongated and are of a width to closely fit the bolts, as best shown in Fig. 2. The intersections of the elongated openings 38, 39 permit the springs to swing relatively to the brackets about the pivots 35. With this construction, if it should be found that when the bumper is fitted to the vehicle it dips or is raised above the horizontal, the nuts of the forward bolts 34 may be loosened so as to permit the bumper bar to swing about the axes of the rear bolts 35, and after the adjustment is effected the nuts of said forward bolts are tightened to maintain the proper adjustment.

The vertical adjustment of the bumper may be further or independently modified by forming the bearing points 16 of the saddles on short stout studs 40 which are screw threaded in bosses 41 formed integral with the rear ends of said saddles. The upper ends of said studs are slotted to receive a screw driver and the bosses are formed with small openings for the passage of a screw driving implement.

In some instances it is desirable to adjust the bumper with respect to its projection from the vehicle so as to effect a proper proportioning of the position of the bumper with respect to the frame and wheels and to the lines of the vehicle proper. In order to permit this adjustment I may provide the shanks of the brackets 14 with a plurality of rear openings 37 and provide the terminals of the springs 25 with longitudinally disposed slots 39, which cross or intersect the shank slots 38. When an elongative adjustment is to be made the rear bolts 35 are removed and the nuts of the forward bolts are loosened and the springs shifted forwardly or rearwardly, as the case may require, as permitted by the intersection of the slots 38, 39. Thereafter the rear bolts are fitted in place and the nuts of both front and rear bolts are tightened to lock the bumper bar in its adjusted position.

The bumper may be adjusted to vehicles of different widths by the employment of the fittings 30, before referred to. The said fittings, as herein shown, each comprises a channeled block, the flanges 45 of which are somewhat longer than the web 46. The length of the flanges is such that they fill the space between the flanges 13 of the bumper bar. The central portion 26 of the spring is clamped between the web of the bumper bar and the forward edges of the flanges 45 of the block. The said block is pressed against the spring by means of a T-shaped bolt 47, the cross member 48 of which lies between the flanges 45 and the threaded shank of which extends rearwardly through an opening in the web 46 of the block. The ends of the cross member 48 of the bolt extend into openings 50 of the flanges of the bumper bar so as to anchor the bolt to the bumper bar. The said ends of the cross member of the bolt are engaged with said flanges by slightly canting or tilting the fitting, as it is fitted to the bumper bar, and when the bolt and block are adjusted vertically a reliable interlocking engagement of the bolt with the bumper bar is effected. The threaded shank of the bolt receives a nut 52 and preferably also a lock washer 53. When said nut is screwed against the web of the channeled block the block is forced against the spring in a manner to clamp the spring fixedly against the bumper bar. The central portion of the member 26 of the spring is preferably flattened so as to permit adjustment of the spring endwise of the bar, and further adjustment may be afforded by providing two or more sets of holes 50 in the bumper bar.

It will be understood that the details of the structure shown may be varied within the spirit and scope of the invention and that the invention is not limited to said details, except as to claims wherein the details are specifically enumerated. It will of course be understood that my improvements may be applied to a rear bumper and that the attaching devices by which the bumper is fixed to the frame will be made to conform to the type of rear spring used on the vehicle.

I claim as my invention:

1. In a bumper, the combination with a bumper bar, of a closed leaf spring comprising a curved central member attached centrally thereof to said bar, converging members opposed to said curved member and terminals brought out from said converging members, and an attaching bracket fixed to said terminals.

2. In a bumper, the combination with a bumper bar, of a closed leaf spring comprising a curved central member attached centrally thereof to said bar, converging members opposed to said curved member and parallel terminals, a bracket extending between and fastened to said terminals and means to attach said bracket to the frame member of a vehicle.

3. In a bumper, the combination with a bumper bar, of a closed leaf spring comprising a curved central member attached centrally thereof to said bar, converging members opposed to said curved member, apertured terminals brought out from said converging members, an attaching bracket lying between said terminals, and bolts extending through the apertures of the terminals and through registering openings in the bracket, one of said bracket openings being elongated transversely of the bracket.

4. In a bumper, the combination with a bumper bar, of an apertured member attached to said bar and extending rearwardly therefrom, an attaching bracket overlapping said member, and bolts extending through the apertures of said member and through registering openings in the bracket, one of the bracket openings being elongated transversely of the bracket.

5. In a bumper, the combination with a bumper bar, of an elliptical leaf spring of which the leaf is vertically edgewise, and is bent to form a rearwardly-extending arm apertured for attachment; an attaching bracket provided with a series of openings spaced longitudinally of the bracket, and a bolt extending through the aperture of said rearwardly-extending arm of the spring to engage at either of the openings of said series.

6. The combination with a bumper member having a rear bolt opening and a front longitudinally disposed slot, of a bracket overlapping said member and provided toward its rear end with a longitudinal series of bolt openings adapted, by endwise displacement of said member, to separately register with the rear opening of said member, and provided toward its forward end with a bolt opening, to register with said slot and clamping bolts fitted in said registering openings.

7. The combination with a bumper member having a rear bolt opening and a front longitudinally disposed slot, of a bracket overlapping said member and provided toward its rear end with a longitudinal series of bolt openings adapted, by endwise displacement of said member, to separately register with the rear openings of said member, and provided toward its forward end with a transversely elongated opening adapted to intersect the slot in said member and clamping bolts fitted in said registering openings.

8. A bumper bar supporting and thrust resisting spring made of a single spring leaf and comprising a central curved member, two converging members opposed to the central member and terminal members brought out from the converging members.

9. A bracket for attaching a bumper to the frame member of a vehicle, formed at one end with a saddle to engage a supporting surface of the frame member, and at its other end with a shank, and means to clamp the saddle to said frame member, said saddle being provided at one end with a pointed projection and at its other end with ribs to provide a three point bearing.

10. A bumper attaching bracket formed with a saddle to engage a supporting surface of a frame member and an adjustable member associated with said saddle to constitute a bearing point of the saddle on said surface and to vary the inclination of the bracket to said frame member.

11. A bumper attaching bracket formed with a saddle provided with a three-point contact for engagement with a supporting surface of a frame member, one of said points of contact being adjustable to vary the inclination of said bracket to said frame member.

12. A bumper attaching bracket formed with a three-point contact for engagement with a bearing surface of a frame member, one of said points of contact comprising a stud screw threaded to the bracket.

13. A bracket for attaching a bumper to the frame member of a vehicle formed to provide a saddle to engage a supporting surface on the frame member, angular clamping bolts connected to said bracket and extending on opposite sides of the frame member, nuts threaded to said bolt and means coöperating with the tightening action of the nuts to force the bolts toward each other and closely against the sides of the frame member.

14. A bracket for attaching a bumper to the frame member of a vehicle formed to provide a saddle to engage a supporting surface on the frame member, angular clamping bolts connected to said bracket and extending on opposite sides of the frame member, the bracket having inclined pockets for engagement by the shorter inturned ends of said bolts, and nuts threaded to said bolts.

15. A bracket for attaching a bumper to the frame member of a vehicle formed to provide a saddle to engage a supporting surface on the frame member, angular clamping bolts, the longer members of which extend along the opposite sides of the frame member, the bracket being formed with opposed inwardly tapered pockets for engagement by the shorter members of the bolts, a tie bar through which the longer members of the bolts extend, and nuts threaded to said longer members of the bolts.

16. In a bumper, the combination with a channeled bumper bar and a leaf thrust resisting spring having a portion thereof lying between the flanges of said bar and against the web thereof, of a clamping block between the flanges of the bumper bar and bearing against said spring, and means engaging said flanges to force said block against said spring.

17. In a bumper, the combination with a channeled bumper bar and a leaf thrust resisting spring having a portion thereof lying between the flanges of said bar and against the web thereof, of a clamping block between the flanges of the bumper bar and bearing against said spring, a bolt anchored to the flanges of said bar and a nut threaded to said bolt and acting against said block to press it against said spring in a manner to clamp the spring between the block and the web of the bumper bar.

18. In a bumper, the combination with a channeled bumper bar and a leaf thrust resisting spring having a portion thereof lying between the flanges of said bar and against the web thereof, of a clamping block between the flanges of the bumper bar and bearing against said spring, a T bolt, the ends of the cross member of which are interlocked to the flanges of said bar, and a nut threaded to said bolt and adapted to act against said block.

19. In a bumper, the combination with a channeled bumper bar and a leaf thrust resisting spring having a portion thereof lying between the flanges of said bar and against the web thereof, of a channeled clamping block between the flanges of the bumper bar and bearing at the edges of its flanges against said spring, a T bolt, the cross member of which lies between the flanges of said block, with the ends thereof anchored to the flanges of said bar, the shank of said bolt extending through an opening in the web of said block, and a nut threaded to said shank and acting against said block.

In witness whereof I claim the foregoing as my invention, I hereunto append my signature in the presence of two witnesses at Chicago, Illinois, this 18th day of October, 1916.

THOMAS I. DUFFY.

Witnesses:
W. L. HALE,
A. E. WALBRIDGE.